US012100426B2

(12) United States Patent
Atkins et al.

(10) Patent No.: US 12,100,426 B2
(45) Date of Patent: Sep. 24, 2024

(54) VIDEO CONTENT CREATION TOOL AND METHOD

(71) Applicant: Dolby Laboratories Licensing Corporation, San Francisco, CA (US)

(72) Inventors: Robin Atkins, Vancouver (CA); Gaven Wang, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 96 days.

(21) Appl. No.: 18/010,186

(22) PCT Filed: Jul. 7, 2021

(86) PCT No.: PCT/US2021/040591
§ 371 (c)(1),
(2) Date: Dec. 13, 2022

(87) PCT Pub. No.: WO2022/015540
PCT Pub. Date: Jan. 20, 2022

(65) Prior Publication Data
US 2023/0230618 A1   Jul. 20, 2023

Related U.S. Application Data

(60) Provisional application No. 63/053,097, filed on Jul. 17, 2020.

(30) Foreign Application Priority Data

Jul. 17, 2020 (EP) .................................. 201864840

(51) Int. Cl.
*G11B 27/031* (2006.01)

(52) U.S. Cl.
CPC ................................ *G11B 27/031* (2013.01)

(58) Field of Classification Search
CPC ..................................................... G11B 27/031
See application file for complete search history.

(56) References Cited

U.S. PATENT DOCUMENTS 6,771,323 B1   8/2004   Dean
7,333,154 B2   2/2008   Dean
(Continued)

OTHER PUBLICATIONS

Jordon, L., FCP X: Conform Different Video Frame Rates, p. 1-3, Oct. 18, 2015.
(Continued)

*Primary Examiner* — Sunghyoun Park

(57) ABSTRACT

A content-creation tool includes a processor and a memory. The processor is configured to receive a first video clip and a second video clip, a respective first and second metadata-item thereof being set to a respective first and second metadata-value. The memory stores video-editing software that includes a timeline interface and instructions that, when executed by the processor, control the processor to: add the first video clip to the timeline interface as a first timeline-track that retains the first metadata-value; add the second video clip to the timeline interface as a second timeline-track that retains the second metadata-value; and generate a frame sequence that includes a plurality of video frames. Each video frame is a frame of, or a frame derived from, one of (i) the first timeline-track, (ii) the second timeline-track, and (iii) a composited time-line-track composited from at least one of the first and second timeline-tracks.

16 Claims, 9 Drawing Sheets

(56) References Cited

U.S. PATENT DOCUMENTS

| | | |
|---|---|---|
| 7,364,306 B2 | 4/2008 | Margulis |
| 7,788,395 B2 | 8/2010 | Bowra |
| 7,873,225 B2 | 1/2011 | Wallace |
| 8,396,114 B2 | 3/2013 | Gu |
| 8,638,288 B2 | 1/2014 | Taylor |
| 8,643,662 B2 | 2/2014 | Tran |
| 8,874,777 B2 | 10/2014 | Ma |
| 2012/0210232 A1* | 8/2012 | Wang ............... H04N 19/117 715/723 |
| 2014/0096002 A1* | 4/2014 | Dey ............... G06F 3/04817 715/723 |
| 2016/0042765 A1* | 2/2016 | Saini ............... G11B 27/34 715/723 |
| 2017/0180694 A1 | 6/2017 | Stauder |
| 2018/0115592 A1 | 4/2018 | Samineni |
| 2019/0304407 A1 | 10/2019 | Atkins |
| 2019/0333233 A1* | 10/2019 | Hu ............... G01S 13/04 |

OTHER PUBLICATIONS

McAfee, R., Video Editing: Working With Multiple Frame Rates and Aspect Ratios, POND5 Blog, p. 1-12, Feb. 14, 2017.

* cited by examiner

700

311
Add a first video clip, to a timeline interface of video-editing software, as a first timeline-track that retains a first metadata-value of the first video clip.

312
Add a second video clip, to the timeline interface, as a second timeline-track that retains a second metadata-value of the second video clip.

720
Determine an interpolated metadata-value as a weighted sum of the first metadata-value and the second metadata-value.

731
Convert the first timeline-track to a first converted track, the first metadata-item thereof being set to the interpolated metadata-value

732
Convert the second timeline-track to a second converted track, the first metadata-item thereof being set to the interpolated metadata-value.

740
Generate the composited timeline-track by digitally compositing the first and second converted tracks.

550
Generate a frame sequence that includes a plurality of video-frames, each of the plurality of video-frames being a frame of, or a frame derived from, one of (i) the first timeline-track, (ii) the second timeline-track, and (iii) the composited video track.

FIG. 7

VIDEO CONTENT CREATION TOOL AND METHOD

CROSS-REFERENCE TO RELATED APPLICATIONS

This application is a U.S. National Stage application under U.S.C. 371 of International Application No. PCT/US2021/040591, filed on 7 Jul. 2021, which claims the benefit of priority of U.S. Provisional Application No. 63/053,097, filed Jul. 17, 2020 and European Patent Application No. 20186484.0, filed Jul. 17, 2020, each of which is hereby incorporated by reference in its entirety.

TECHNOLOGY

Embodiments disclosed herein pertain to how video post-production tools process dynamic metadata of multiple video source clips.

BACKGROUND

FIG. 1 depicts an example process of a video delivery pipeline 195 showing various stages from video capture to video content display. A sequence of video frames 102 is captured or generated using image generation block 105. Video frames 102 may be digitally captured (e.g. by a digital camera) or generated by a computer (e.g. using computer animation) to provide video data 107. Alternatively, video frames 102 may be captured on film by a film camera, in which case the film is converted to a digital format to provide video data 107. In a production phase 109, video data 107 is edited to provide a video production stream 190.

Video clips of video production stream 190 are then provided to a processor at a post-production block 115 for post-production editing. Editing at post-production block 115 may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at post-production block 115 to yield a frame sequence 140 of the production for distribution. During post-production editing of post-production block 115, video images are viewed on a reference display 125, which is connected to post-production block 115 via a digital video interface 124.

Following post-production at post-production block 115, video data of frame sequence 140 may be delivered to an encoder 120 for delivering downstream to decoding and playback devices such as television sets, set-top boxes, movie theaters, and the like. In some embodiments, encoder 120 may include audio and video encoders, such as those defined by ATSC, DVB, DVD, Blu-Ray, and other delivery formats, to generate an encoded bitstream 122. In a receiver, encoded bitstream 122 is decoded by a decoder 130 to generate a decoded signal 132 representing an identical or close approximation of the video data corresponding to frame sequence 140. The receiver may be attached to a target display 151, which may have completely different characteristics from reference display 125. In that case, a display management unit 135 may be used to map the dynamic range of decoded signal 132 to the characteristics of the target display 151 by generating display-mapped signal 137. Target display 151 may be a reference monitor, computer monitor or display, a television set, a head-mounted display, a virtual retinal display, or the like.

Post-production block 115 includes a content creation tool 100 that includes video-editing software that has a timeline interface. In post-production block 115, video clips of video production stream 190 are merged (edited) together in the timeline interface and transformed first to a common setting regarding color space, resolution, frame rate, etc.

BRIEF DESCRIPTION OF THE FIGURES

FIG. 7 is a flowchart illustrating an embodiment of the method of FIG. 3 that is implementable by the content creation tool of FIG. 6.

SUMMARY

Figure 1:
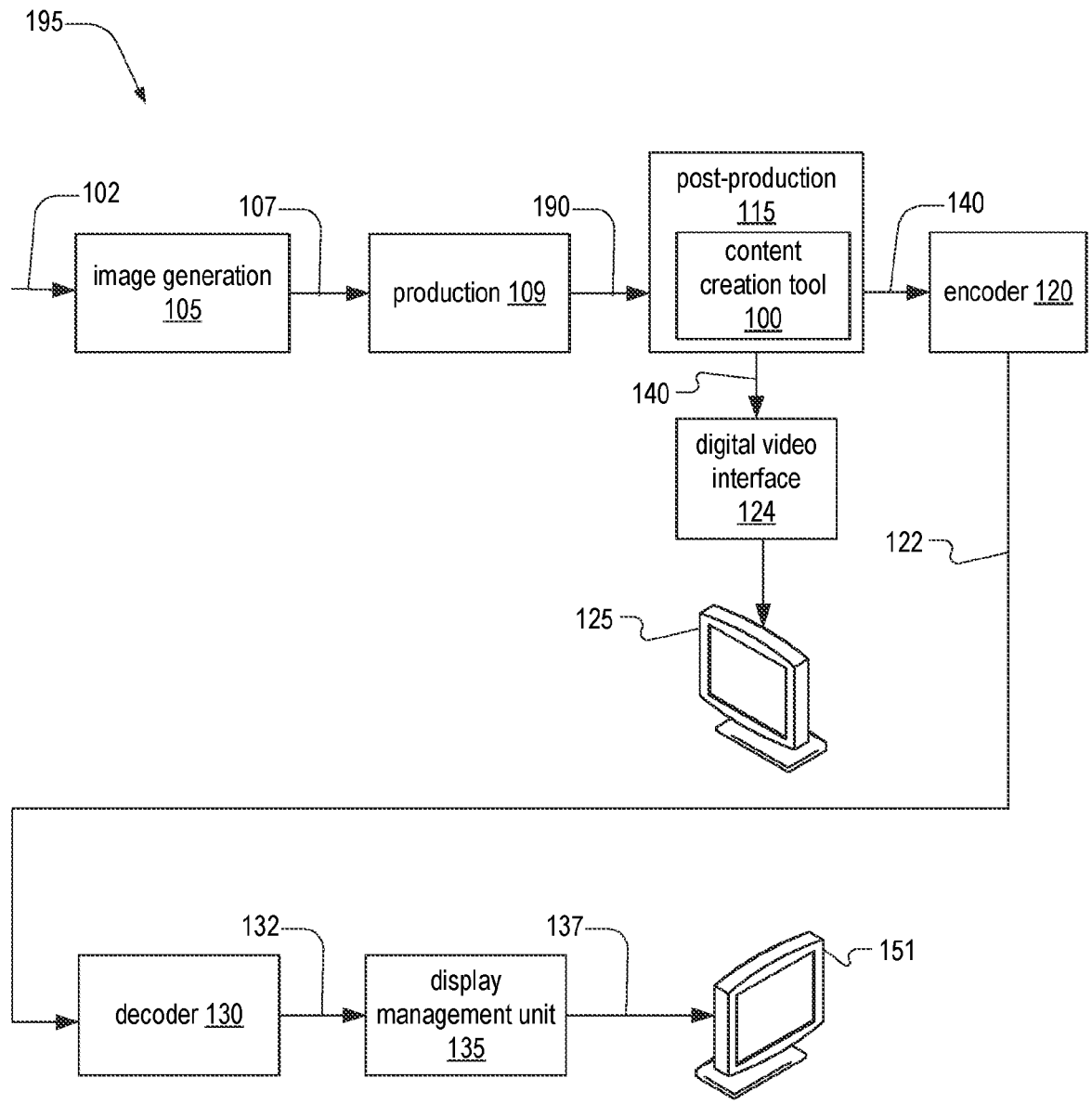
FIG. 1 depicts a video delivery pipeline that includes an encoder and a decoder, in an embodiment.

In a first aspect, a content-creation tool includes a processor and a memory. The processor is configured to receive a first video clip and a second video clip. A first metadata-item of the first video clip is set to a first metadata-value; the first metadata-item of the second video clip is set to a second metadata-value. The memory stores video-editing software that includes a timeline interface and non-transitory computer-readable instructions that, when executed by the processor, control the processor to: add the first video clip to the timeline interface as a first timeline-track that retains the first metadata-value of the first video clip; add the second video clip to the timeline interface as a second timeline-track that retains the second metadata-value of the second video clip; and generate a frame sequence that includes a plurality of video frames. Each of the plurality of video frames is a frame of, or a frame derived from, one of (i) the first timeline-track, (ii) the second timeline-track, and (iii) a composited timeline-track composited from at least one of the first and second timeline-tracks.

In a second aspect, a video-content creation method includes (a) adding a first video clip, to a timeline interface of video-editing software, as a first timeline-track that retains a first metadata-value of the first video clip; (b) adding a second video clip to the timeline interface as a second timeline-track that retains a second metadata-value of the second video clip; and (c) generating a frame sequence that includes a plurality of video frames, each of the plurality of video frames being a frame of, or a frame derived from, one of (i) the first timeline-track, (ii) the second timeline-track, and (iii) a composited timeline-track composited from at least one of the first and second timeline-tracks.

DETAILED DESCRIPTION OF THE EMBODIMENTS

As used herein, the term "timeline" refers to a term used in video editing which refers to a user interface that enables authors to lay a video project out in a linear fashion horizontally across a monitor thus providing a chronological display of an edited sequence in a non-linear editing system. A timeline may include one or more timeline-tracks (also known as video tracks), each one representing a separate sequence of video frames or pictures. In many circumstances, given a variety of video clips to be combined together, each one with different characteristics (e.g., resolution, frame rate, color gamut, and the like), a conformance to common settings for the timeline causes unnecessary resampling of the color settings, resolution, or frame rate, which may introduce color artifacts, motion artifacts or undesired smoothness, judder, or flicker in the content.

Embodiments disclosed herein improve the quality of post-production tools by disclosing a method whereby content creation tools may use dynamic metadata associated with each source clip in a timeline, which is transmitted to a compatible reference display device, which can adjust its settings to correctly display each type of content as it was intended. This allows greater flexibility to the content producer, minimizes resampling artifacts, and creates an improved playback experience. Such a clip is intended for a display supporting adaptive color settings, resolutions, and variable refresh rates.

Figure 2:
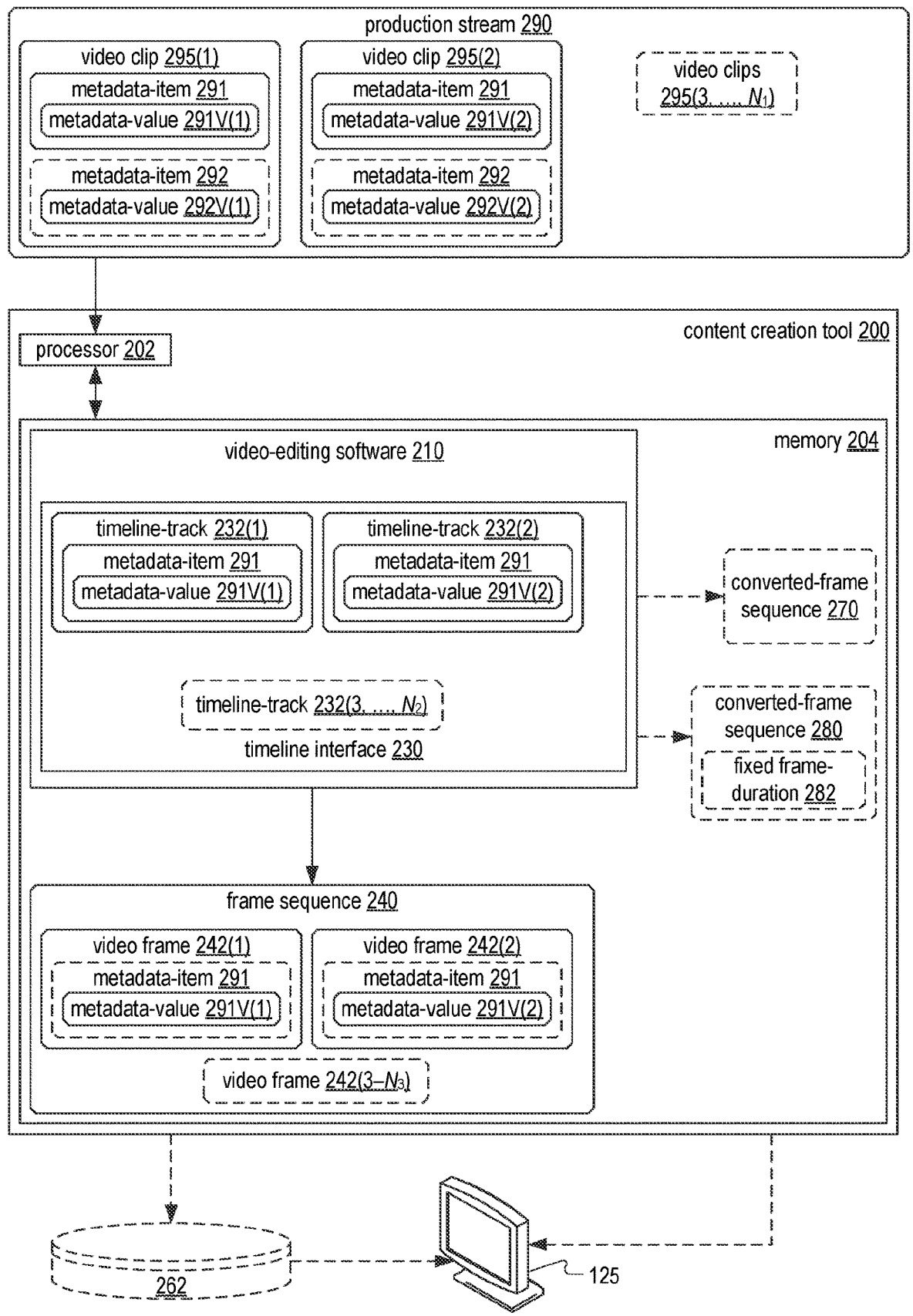
FIG. 2 is a schematic block diagram of a content creation tool, which in a use scenario replaces the content creation tool of the video delivery pipeline of FIG. 1, in an embodiment.

FIG. 2 is a schematic block diagram of a content creation tool 200, which in a use scenario replaces content creation tool 100 in video delivery pipeline 195. Content creation tool 200 includes a processor 202 and a memory 204. Processor 202 is configured to receive video clips 295(1) and 295(2) of a production stream 290, which is an example of video production stream 190, FIG. 1. A metadata-item 291 of video clips 295(1) and 295(2) is set to a metadata-values 291V(1) and 291V(2) respectively. In embodiments, at least one of: (a) metadata-items and metadata-values disclosed herein are key-value pairs; (b) one or both of video clips 295(1) and 295(2) is a single video frame, and (c) metadata-value 291V(2) differs from metadata-value 291V(1). In embodiments, production stream 290 includes additional video clips 295(3-$N_1$), where clip-count $N_1$ is an integer greater than or equal to three.

Memory 204 stores video-editing software 210 that includes (i) a timeline interface 230 and (ii) non-transitory computer-readable instructions that, when executed by processor 202, control processor 202 to implement the functionality of content-creation tool 200. In embodiments, said functionality includes timeline interface 230. In embodiments, video-editing software 210 includes functionality to create, mix, calibrate, monitor, and produce images, signals, videos, and film visual effects.

When executed by processor 202, software 210 controls processor 202 to (i) add video clip 295(1) to timeline interface 230 as a timeline-track 232(1) and (ii) add video clip 295(2) to timeline interface 230 as a timeline-track 232(2). Timeline-track 232(1) retains metadata-value 291V(1) of video clip 295(1), such that metadata-item 291 of timeline-track 232(1) is set to metadata-value 291V(1). Timeline-track 232(2) retains metadata-value 291V(2) of video clip 295(2), such that metadata-item 291 of timeline-track 232(2) is set to metadata-value 291V(2). In embodiments, timeline interface 230 includes additional timeline-tracks 232(3-$N_2$), where track-count $N_2$ is an integer greater than or equal to three and may be equal to frame-count $N_1$.

When executed by processor 202, software 210 also control processor 202 to generate a frame sequence 240 that includes video frames 242(1) and 242(2). Frame sequence 240 may also include video frames 242(3-$N_3$) where frame-count $N_3$ is an integer greater than or equal to three. Each video frame 242 is a frame of, or a frame derived from, one of (i) timeline-track 232(1), (ii) timeline-track 232(2), and (iii) a composited timeline-track composited from at least one of timeline-tracks 232(1) and 232(2). In embodiments, the composited timeline-track is one of timeline-tracks 232(3-$N_2$). Frame sequence 240 is an example of frame sequence 140 when content creation tool 200 replaces content creation tool 100 in video delivery pipeline 195. During a process of generating frame sequence 240, timeline interface 230 may include any combination of timeline-tracks stored in memory 204, either simultaneously, non-simultaneously, or in combinations thereof.

In embodiments, metadata of each video frame 242 includes metadata-item 291. In embodiments, metadata-item 291 of video frame 242(1) is set to metadata-value 291V(1) and metadata-item 291 of video frame 242(2) is set to metadata-value 291V(2). In embodiments, video frames 242(1) and 242(2) derive from timeline-track 232(1) and 232(2) respectively, and video frame 242(2) temporally follows video frame 242(1) in frame sequence 240.

In embodiments, the metadata-item 291 including one of frame rate, video resolution, color space, RGB primaries, RGB signal color range, YUV Matrix, YUV offset, electro-optic transfer function, gamma, tone-curve parameters, dynamic range, minimum luminance, maximum luminance, color gamut size, opponent matrix, bit depth, and chroma subsampling.

In embodiments, frame sequence 240 includes a temporal cross-fade (also known as a dissolve) between timeline-track 232($k_1$) and timeline-track 232($k_2$), such that each video frame 242 constituting the cross-fade has a respective metadata-value 291V that is an interpolation between metadata-values 291V($k_1$) and metadata-values 291V($k_2$) Metadata-values 291V at the start and end of the cross-fade are metadata-values 291V($k_1$) and 291V($k_2$) respectively, and indices $k_1$ and $k_2$ are non-consecutive integers in the range 1 to $N_2$. In embodiments, metadata-values 291V between indices $k_1$ and $k_2$ are interpolated (linearly, for example) between metadata-values 291V($k_1$) and 291V($k_2$).

For example, consider a crossfade between two image sequences $I_1(0, 1, 2, \ldots, N)$ and $I_2(0, 1, 2, \ldots, N)$, where $N \geq 2$ is a positive integer Image sequences $I_1$ and $I_2$ are examples of video clips 295(1) and 295(2), respectively. Any number of images $I_1(0-N)$ may be identical and any number of images $I_2(0-N)$ may be identical. For example, in embodiments, at least one of the following is true: (i) each of images $I_1(0-N)$ is identical, and (ii) each of images $I_2(0-N)$ is identical.

At time $t_0=0$ the cross fade displays only image $I_1(0)$; at time $t_N=T$ the cross fade displays only image $I_2(N)$. The $n^{th}$ output image $I_n^{out}$ during a crossfade period $[0, T]$ may be expressed by equation (1), where integer n is in the range 0 to N.

$$I_{out}(n) = (1-\alpha_n)I_1(n) + \alpha_n I_2(n) \quad (1)$$

Coefficient $\alpha_n$ denotes a weighting factor in the range [0,1] that varies over the crossfade period according to a smooth non-decreasing function (e.g., a spline, a sigmoid function, and the like) which starts at $\alpha_0=0$ and ends at $\alpha_N=1$.

Metadata values of image sequences $I_1$ and $I_2$ may also be interpolated using a similar weighting function, as shown in equation (2), where metadata values of image $I_1(n)$ and $I_2(n)$ are $V_1(n)$ and $V_2(n)$, respectively.

$$V_{out}(n)=(1-\beta_n)V_1(n)+\beta_n V_2(n) \quad (2)$$

Coefficient $\beta_n$ denotes a weighting factor in the range [0,1] that varies over the crossfade period according to a smooth non-decreasing function (e.g., a spline, a sigmoid function, and the like) which starts at $\beta_0=0$ and ends at $\beta_N=1$. Weights $\alpha_n$ and $\beta_n$ may be different or the same depending on the metadata type.

Then, both images are modified to match the corresponding metadata. For example, each image $I_1(n)$ is translated into a modified image $I'_1(n)$ according to metadata-value $V_1(n)$ and each image $I_2(n)$ is translated into a modified image $I'_2(n)$ according to metadata-value $V_2(n)$. Then, by combining these two modified images, the crossfade may be expressed as equation (3).

$$I'_{out}(n)=(1-\alpha_n)I'_n(n)+\alpha_n I'_2(n) \quad (3)$$

In embodiments, modified output image $I'_{out}(n)$ has a metadata-value equal to $V_{out}(n)$ of equation (2).

In embodiments, modified images $I'_1(n)$ and $I'_2(n)$ are generated by taking into consideration the original images, the original metadata-values (e.g., $V_1(n)$ and $V_2(n)$) and the final blended metadata (e.g., $V_{out}(n)$). For example, they can be expressed as in equation (4).

$$I'_1(n)=f_c(I_1(n), V_1(n), V_{out}(n))$$

$$I'_2(n)=f_c(I_2(n), V_2(n), V_{out}(n)) \quad (4)$$

Function $f_c(\cdot)$ denotes the conversion function from an initial metadata state to the output state. Using spatial resolution as an example metadata type, let images in the first sequence have a resolution of 1920×1080 and let images in the second sequence have a resolution of 960×540, then, halfway through the transition at a time $t_k$, conversion function $f_c(\cdot)$ converts $I_1(k)$ and $I_1(k)$ to an intermediate resolution (say 1440×810) so that blending according to equation (3) can be performed with both images at the same resolution. Similar conversions may also apply to frame rate, color space transformations, and the like.

In embodiments, a digital video interface, such as digital video interface 124 is communicatively coupled to content-creation tool 200. In embodiments, metadata-item 291 is frame duration and software 210 further storing instructions that, when executed by processor 202, control the processor to enable the digital video interface to support carriage of variable-refresh rate metadata. Examples of the digital video interface include Serial Digital Interface (SDI), Serial Data Transport Interface (SDTI), asynchronous serial interface, SMPTE 349M, and High-Definition Multimedia Interface (HDMI).

In embodiments, content creation tool 200 is communicatively coupled to a storage device 262, which enables frame sequence 240 to be stored thereon. Storage device 262 includes non-volatile and/or non-transitory memory such as FLASH, ROM, magnetic memory, magnetic disk, and other nonvolatile memory known in the computer art.

Figure 3:
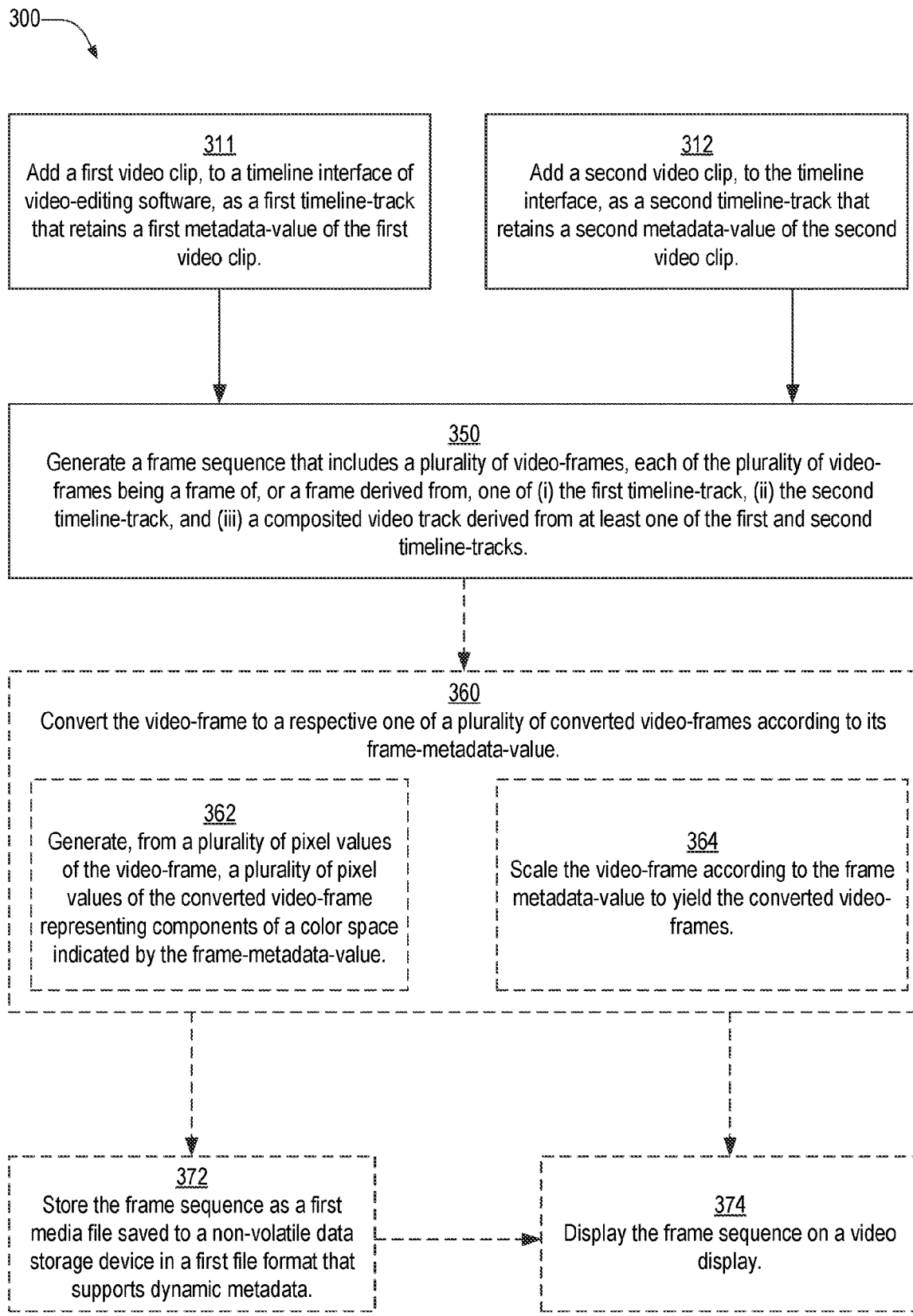
FIG. 3 is a flowchart illustrating a video-content creation method implementable by the content creation tool of FIG. 2, in an embodiment.

FIG. 3 is a flowchart illustrating a video-content creation method 300. In embodiments, method 300 is implemented within one or more aspects of content creation tool 200. In embodiments, method 300 is implemented by processor 202 executing computer-readable instructions of software 210. Method 300 includes steps 311, 312, and 350. Method 300 may also include at least one of steps 360, 372, and 374. FIGS. 2 and 3 are best viewed together in the following description.

Method 300 refers to a first metadata-item that is set to one of a first and a second metadata-value. In embodiments, the first metadata-item is one of frame rate, video resolution, color space, RGB primaries, RGB signal color range, YUV Matrix, YUV offset, electro-optic transfer function, gamma, tone-curve parameters, dynamic range, minimum luminance, maximum luminance, color gamut size, opponent matrix, bit depth, and chroma subsampling.

Step 311 includes adding a first video clip, to a timeline interface of video-editing software, as a first timeline-track that retains a first metadata-value of the first video clip. In an example of step 311, video clip 295(1) is added to timeline interface 230 as timeline-track 232(1).

Step 312 includes adding a second video clip to the timeline interface as a second timeline-track that retains a second metadata-value of the second video clip. In an example of step 312, video clip 295(2) is added to timeline interface 230 as timeline-track 232(2).

Step 350 includes generating a frame sequence that includes a plurality of video frames, each of the plurality of video frames being a frame of, or a frame derived from, one of (i) the first timeline-track, (ii) the second timeline-track, and (iii) a composited timeline-track composited from at least one of the first and second timeline-tracks. In an example of step 350, video-editing software 210 generates frame sequence 240.

Method 300 may include step 360 when reference display 125 does not support dynamic seamless switching of frame-metadata-values. Step 360 includes, for each video frame of the plurality of video frames having a respective frame-metadata-value assigned to the first metadata-item, converting the video frame to a respective one of a plurality of converted video frames according to its frame-metadata-value. In an example of step 360, content creation tool 200 converts frame sequence 240 to a converted-frame sequence 270.

Step 360 includes step 362 when the first metadata-item is color space. Step 362 includes generating, from a plurality of pixel values of the video frame, a plurality of pixel values of the converted video frame representing components of a color space indicated by the frame-metadata-value. Step 360 includes step 362 when the first metadata-item is video resolution. Step 364 includes scaling the video frame according to the frame metadata-value to yield the converted video frame.

Step 372 includes storing the frame sequence as a first media file saved to a non-volatile data storage device in a first file format that supports dynamic metadata. In an example of step 372, frame sequence 240 is saved to storage device 262. Step 374 includes displaying the frame sequence on a video display. In an example of step 372, reference display 125 receives frame sequence 240 from either content creation tool 200 or storage device 262 and displays frame sequence 240.

Figure 4:
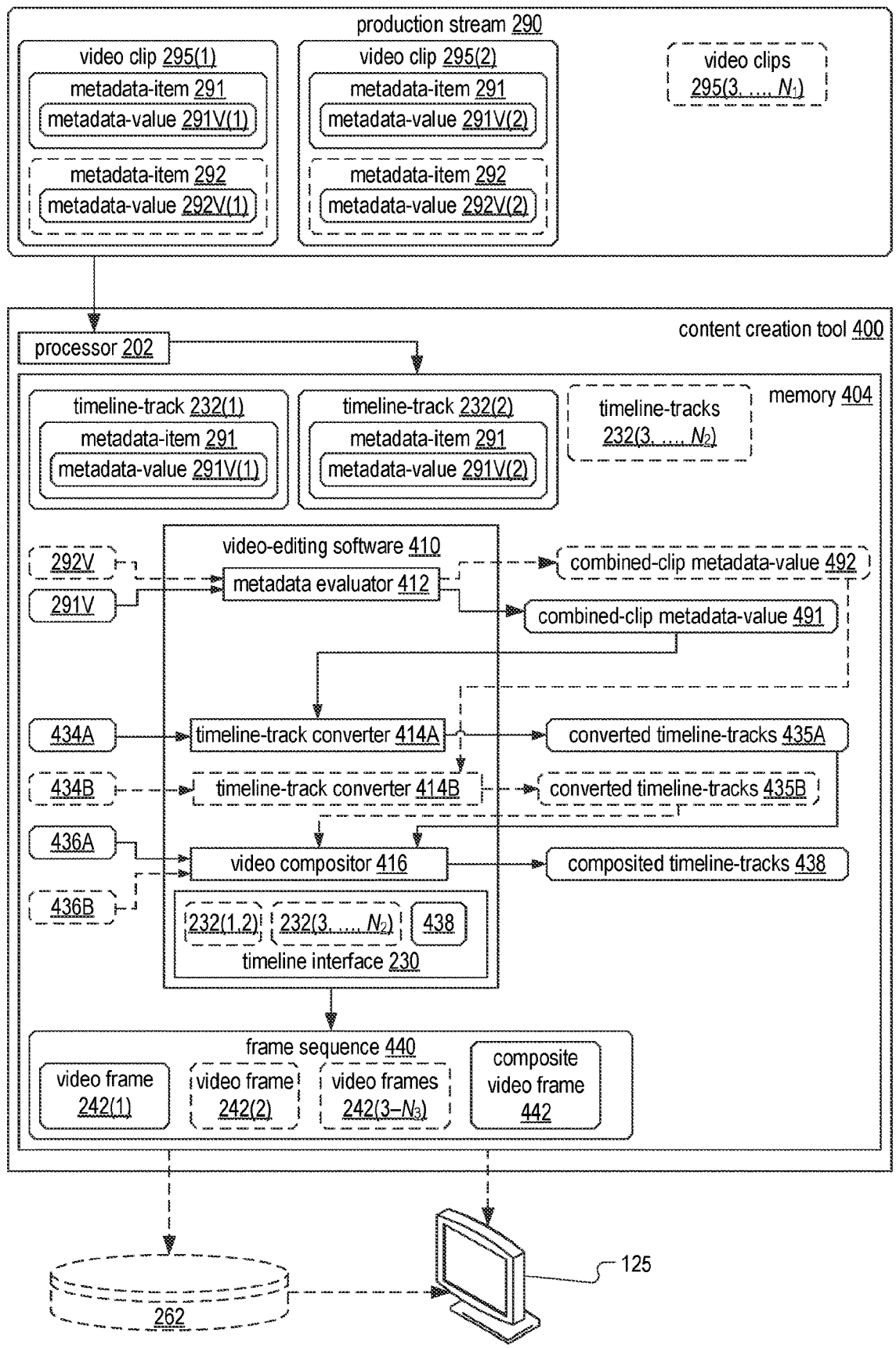
FIG. 4 is a schematic block diagram of a content creation tool, which is an embodiment of the content creation tool of FIG. 2.

FIG. 4 is a schematic block diagram of a content creation tool 400, which is an example of content creation tool 200 that includes memory 404, which stores video-editing software 410. Memory 404 and software 410 are respective examples of memory 204 and video-editing software 210. Machine-readable instructions of video-editing software 410 include a metadata evaluator 412, a timeline-track converter 414A, and, in embodiments, a timeline-track converter 414B. Memory 404 stores frame sequence 440, which is an example of frame sequence 240 that includes a composited video frame 442. Composited video frame 442 is a video frame of, or derived from, the composited timeline-track of step 350. In embodiments, frame sequence 440 includes at least one of video frames 242(1-N₃). Composited video frame 442 may be one of video frames 242. Memory 404 also stores a combined-clip metadata-value 491, converted timeline-tracks 435A, and a composited timeline-track 438. In embodiments, memory 404 also stores a combined-clip metadata-value 492 and converted timeline-tracks 435B.

Figure 5:
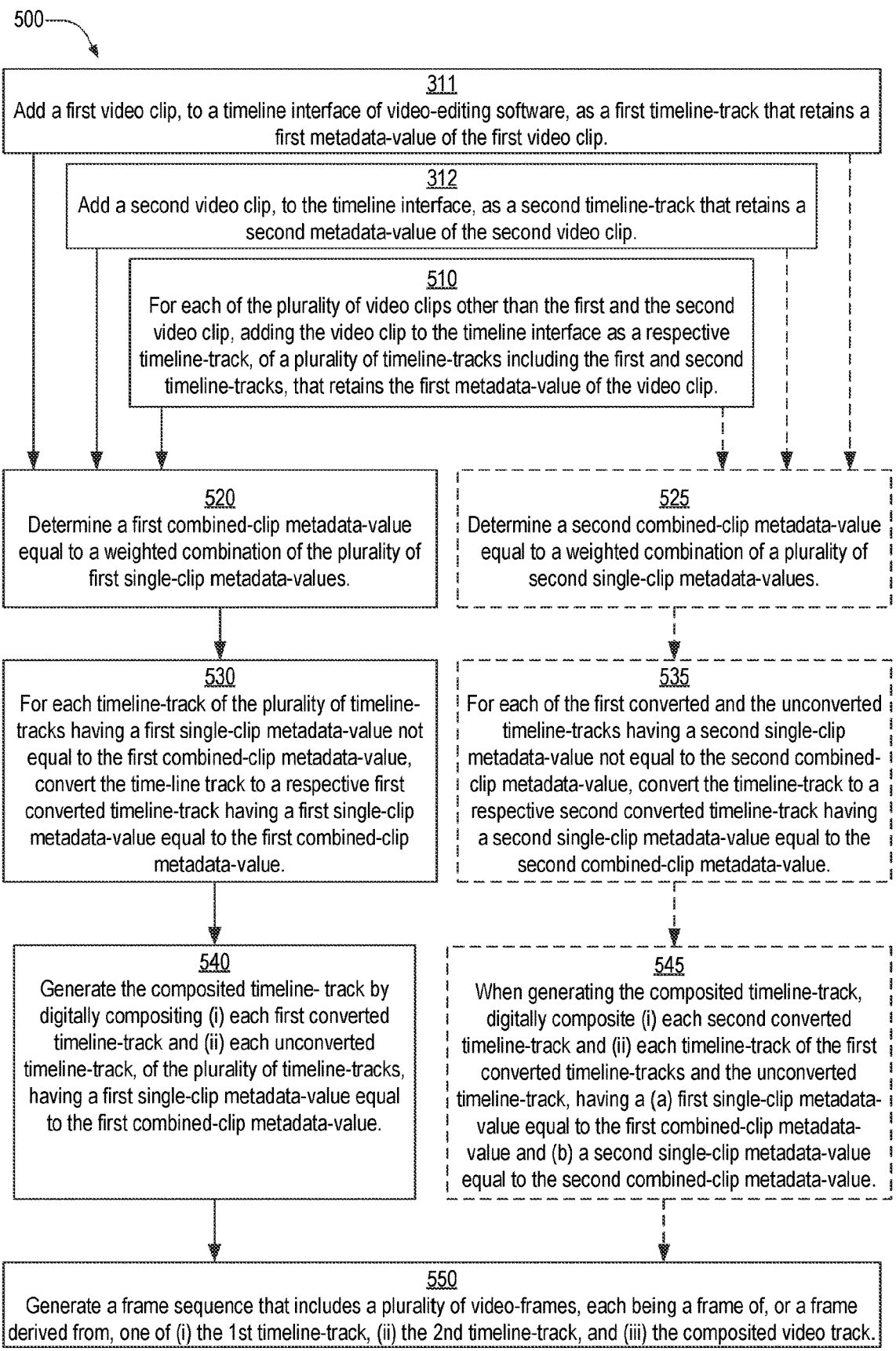
FIG. 5 is a flowchart illustrating an embodiment of the method of FIG. 3 that is implementable by the content creation tool of FIG. 4.

FIG. 5 is a flowchart illustrating a video-content creation method 500. In embodiments, method 500 is implemented within one or more aspects of content creation tool 400. In embodiments, method 500 is implemented by processor 202 executing computer-readable instructions of software 410. FIGS. 4 and 5 are best viewed together in the following description.

Method 500 is an example of method 300 when (i) the first and second video clips are two of a plurality of video clips and (ii) one of the plurality of video frames is a frame of, or a frame derived from, the composited timeline-track. For example, method 500 applies when (i) production stream 290 includes, in addition to video clips 295(1) and 295(2), video clips 295(3-N₁), and (ii) the frame sequence is frame sequence 440, and hence includes composited video frame 442.

Method 500 includes steps 311 and 312 of method 300. Method 500 also includes steps 520, 530, 540, and 550. In embodiments, method 500 also includes steps 525, 535, and 545. Step 550 is an example of step 350.

In method 500, the processor is configured to receive the plurality of video clips and a first metadata-item common to each of the plurality of video clips. The first metadata-item of each of the plurality of video clips is set to a respective one of a plurality of first single-clip metadata-values. Metadata-item 291 is an example of the first metadata item and metadata-values 291V(1-N₁) are an example of the plurality of first single-clip metadata-values.

Step 510 includes, for each of the plurality of video clips other than the first and the second video clip, adding the video clip to the timeline interface as a respective timeline-track, of a plurality of timeline-tracks including the first and second timeline-tracks, that retains the first metadata-value of the video clip. In an example of step 510, content creation tool 200 adds video clips 295(3-N₁) to timeline interface 230 as respective timeline-tracks 232(3-N₁).

Step 520 includes determining a first combined-clip metadata-value equal to a weighted combination (e.g., a weighted sum) of the plurality of first single-clip metadata-values. Examples of such weighting are presented in equations (2) and (3). In embodiments, the first combined-clip metadata-value equals the metadata-value of the plurality of first single-clip metadata-values corresponding to video of the highest video quality (in terms of resolution, bit depth, and the like, for example). In embodiments, the weight associated with each first single-clip metadata-value is an increasing function of the video quality associated the first single-clip metadata-value. In an example of step 520, metadata evaluator 412 determines a combined-clip metadata-value 491 equal to a weighted combination of metadata-items 291(1-N₁). For example, when metadata-item 291 is video resolution, dynamic range, color gamut size, or bit depth, the highest video quality corresponds to the highest video resolution, dynamic range, color gamut size, or bit depth respectively denoted by metadata-items 291(1-N₁).

The following description of method 500 refers to timeline-tracks 434A and unconverted timeline-tracks 436A. Timeline-tracks 434A represent timeline-tracks 232 (at least one timeline-track 232) for which metadata-value 291V does not equal combined-clip metadata-value 491. The remaining timeline-tracks are unconverted timeline-tracks 436A, which represent timeline-tracks 232 for which metadata-value 291V equals combined-clip metadata-value 491.

Step 530 includes, for each timeline-track of the plurality of timeline-tracks having a first single-clip metadata-value not equal to the first combined-clip metadata-value, converting the timeline-track to a respective first converted timeline-track having a first single-clip metadata-value equal to the first combined-clip metadata-value. In an example of step 530, timeline-track converter 414A converts each timeline-track 434A to a respective converted timeline-track 435A.

Step 540 includes generating the composited timeline-track by digitally compositing (i) each first converted timeline-track and (ii) each unconverted timeline-track, of the plurality of timeline-tracks, having a first single-clip metadata-value equal to the first combined-clip metadata-value. In embodiments, the generating the composited timeline-track includes alpha-blending each first converted timeline-track and each unconverted timeline-track when generating the composited timeline-track. In embodiments, the generating the composited timeline-track includes updating metadata of the composited timeline-track such that the first metadata-item (of the composited timeline-track) is set to the first combined-clip metadata-value. In an example of step 540, video compositor 416 generates a composited timeline-track 438 by digitally compositing converted timeline-tracks 435A and unconverted timeline-tracks 436A.

Step 550 includes generating a frame sequence that includes a plurality of video frames, each of the plurality of video frames being a frame of, or a frame derived from, one of (i) the first timeline-track, (ii) the second timeline-track, and (iii) the composited timeline-track. One or more of the plurality of video frames is a frame of, or a frame derived from, the composited timeline-track. In embodiments, step 550 includes generating a frame sequence that includes the plurality of video frames, where at least one of the frames is a frame of, or a frame derived from, the composited timeline-track. In an example of step 550, video editing software 410 generates frame sequence 440, in which composited video frame 442 is a frame of, or a frame derived from, composited timeline-track 438.

In embodiments, method 500 includes steps 525 and 535, which may apply when each video clip 295 has a metadata-item 292 set to a metadata-value 292V. Step 525 includes determining, for a second metadata-item common to each of the plurality of video clips each having a respective one of a plurality of second single-clip metadata-values assigned to the second metadata-item, a second combined-clip metadata-value equal to a weighted combination (e.g., a weighted sum) of the plurality of second single-clip metadata-values. In embodiments, the second combined-clip metadata-value equals the metadata-value of the plurality of second single-clip metadata-values corresponding to the video highest video quality. In embodiments, the weight associated with each second single-clip metadata-value is an increasing function of the video quality associated the second single-clip metadata-value. In an example of step 525, metadata evaluator 412 determines a combined-clip metadata-value 492 equal to a weighted combination of metadata-values 292V(1-$N_1$). For example, when metadata-item 292 is video resolution, dynamic range, color gamut size, or bit depth, the highest video quality corresponds to the highest video resolution, dynamic range, color gamut size, or bit depth respectively denoted by metadata-item 292(1-$N_1$).

The following description refers to timeline-tracks 434B and unconverted timeline-tracks 436B. Timeline-tracks 434B represent unconverted timeline-tracks 436A and converted timeline-tracks 435A for which metadata-value 292V does not equal combined-clip metadata-value 492. The remaining timeline-tracks are unconverted timeline-tracks 436B, which represent timeline-tracks 232 for which (i) metadata-value 291V equals combined-clip metadata-value 491 and (ii) metadata-value 292 equals combined-clip metadata-value 492.

Step 535 includes for each timeline-track of the first converted timeline-tracks and the unconverted timeline-tracks having a second single-clip metadata-value not equal to the second combined-clip metadata-value, converting the timeline-track to a respective second converted timeline-track having a second single-clip metadata-value equal to the second combined-clip metadata-value. In an example of step 535, timeline-track converter 414B converts each timeline-track 434B to a respective converted timeline-track 435B. In embodiments, timeline-track converters 414A and 414B refer to a same set of instructions of video-editing software 410, such that suffixes "A" and "B" merely differentiate respective executions of the timeline-track converter with different inputs.

Step 545 includes, when generating the composited timeline-track, digitally compositing (i) each second converted timeline-track and (ii) each timeline-track of the first converted timeline-tracks and the unconverted timeline-tracks, having a (a) first single-clip metadata-value equal to the first combined-clip metadata-value and (b) a second single-clip metadata-value equal to the second combined-clip metadata-value. In an example of step 545, video compositor 416 generates composited timeline-track 438 by digitally compositing converted timeline-tracks 435A, 435B, and unconverted timeline-tracks 436A, 436B. In embodiments, when method 500 includes step 545, timeline-tracks 232 included in unconverted timeline-tracks 436B are not included in unconverted timeline-tracks 436A to prevent video compositor 416 from receiving a same timeline-track 232 more than once.

Figure 6:
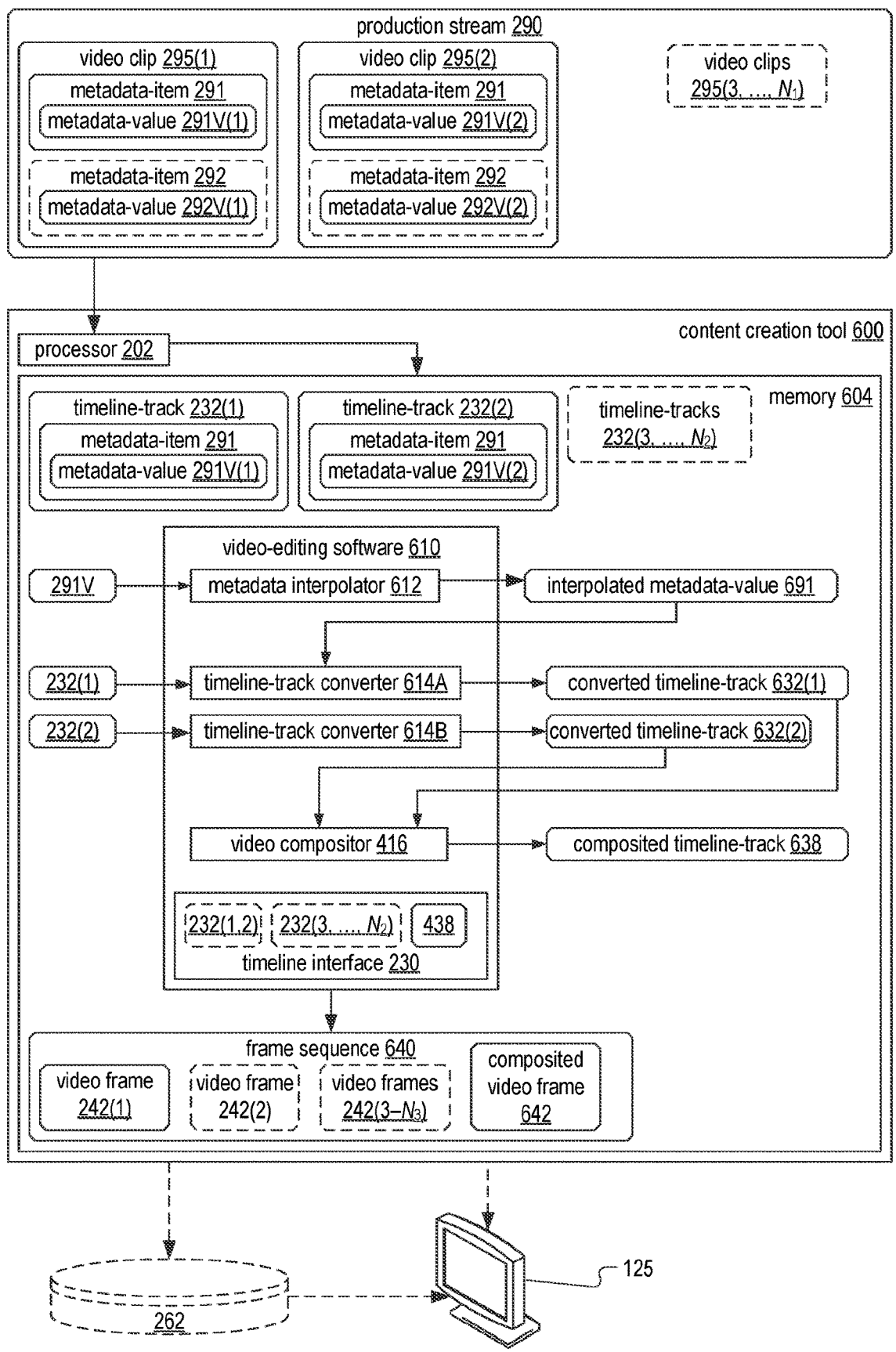
FIG. 6 is a schematic block diagram of a content creation tool, which is an embodiment of the content creation tool of FIG. 2.

FIG. 6 is a schematic block diagram of a content creation tool 600, which is an example of content creation tool 200 that includes memory 604, which stores video-editing software 610. Memory 604 and software 610 are respective examples of memory 204 and video-editing software 210. Machine-readable instructions of video-editing software 610 include a metadata interpolator 612, a timeline-track converter 614A, and a timeline-track converter 614B. Memory 204 of content creation tool 600 stores frame sequence 640, which is an example of frame sequence 240 that includes a composite video frame 642. Composite video frame 642 is a video frame of, or derived from, the composited timeline-track of step 350. In embodiments, frame sequence 640 includes at least one of video frames 242(1-$N_3$). Composite video frame 642 may be one of video frames 242. Memory 204 of content creation tool 600 also stores an interpolated metadata-value 691, converted timeline-tracks 632(1,2), and a composited timeline-track 638.

FIG. 7 is a flowchart illustrating a video-content creation method 700. Method 700 is an example of method 300 when one of the plurality of video frames is a frame of, or a frame derived from, the composited timeline-track. In embodiments, method 700 is implemented within one or more aspects of content creation tool 600. In embodiments, method 700 is implemented by processor 202 executing computer-readable instructions of software 610. FIGS. 6 and 7 are best viewed together in the following description.

Method 700 includes steps 311 and 312 of method 300. Method 700 also includes steps 720, 731, 732, 740, and, from method 500, step 550.

Step 720 includes determining an interpolated metadata-value as a weighted sum of the first metadata-value and the second metadata-value. In an example of step 720, metadata interpolator determines an interpolated metadata-value 691 from metadata-values 291V.

Step 731 includes converting the first timeline-track to a first converted track, the first metadata-item thereof being set to the interpolated metadata-value. In an example of step 731, timeline-track converter 614A converts timeline-track 232(1) to a converted timeline-track 632(1). Metadata-value 291V of converted timeline-track 632(1) is set to interpolated metadata-value 691.

Step 732 includes converting the second timeline-track to a second converted track, the first metadata-item thereof being set to the interpolated metadata-value. In an example of step 732, timeline-track converter 614B converts timeline-track 232(2) to a converted timeline-track 632(2). Metadata-value 291V of converted timeline-track 632(2) is set to interpolated metadata-value 691.

Step 740 includes generating the composited timeline-track by digitally compositing the first and second converted tracks. In embodiments, step 740 includes alpha-blending the first and second converted tracks. In embodiments, the generating the composited timeline-track includes updating metadata of the composited timeline-track such that the first metadata-item (of the composited timeline-track) is set to the interpolated metadata-value. In an example of step 740, video compositor 416 generates a composited timeline-track 638 from converted timeline-tracks 632(1) and 632(2).

Method 700 includes step 550, first introduced in method 500, FIG. 5. In an example of step 550 in method 700, video-editing software 610 generates frame sequence 640, in which composite video frame 642 is a frame of, or a frame derived from, composited timeline-track 638.

Figure 8:
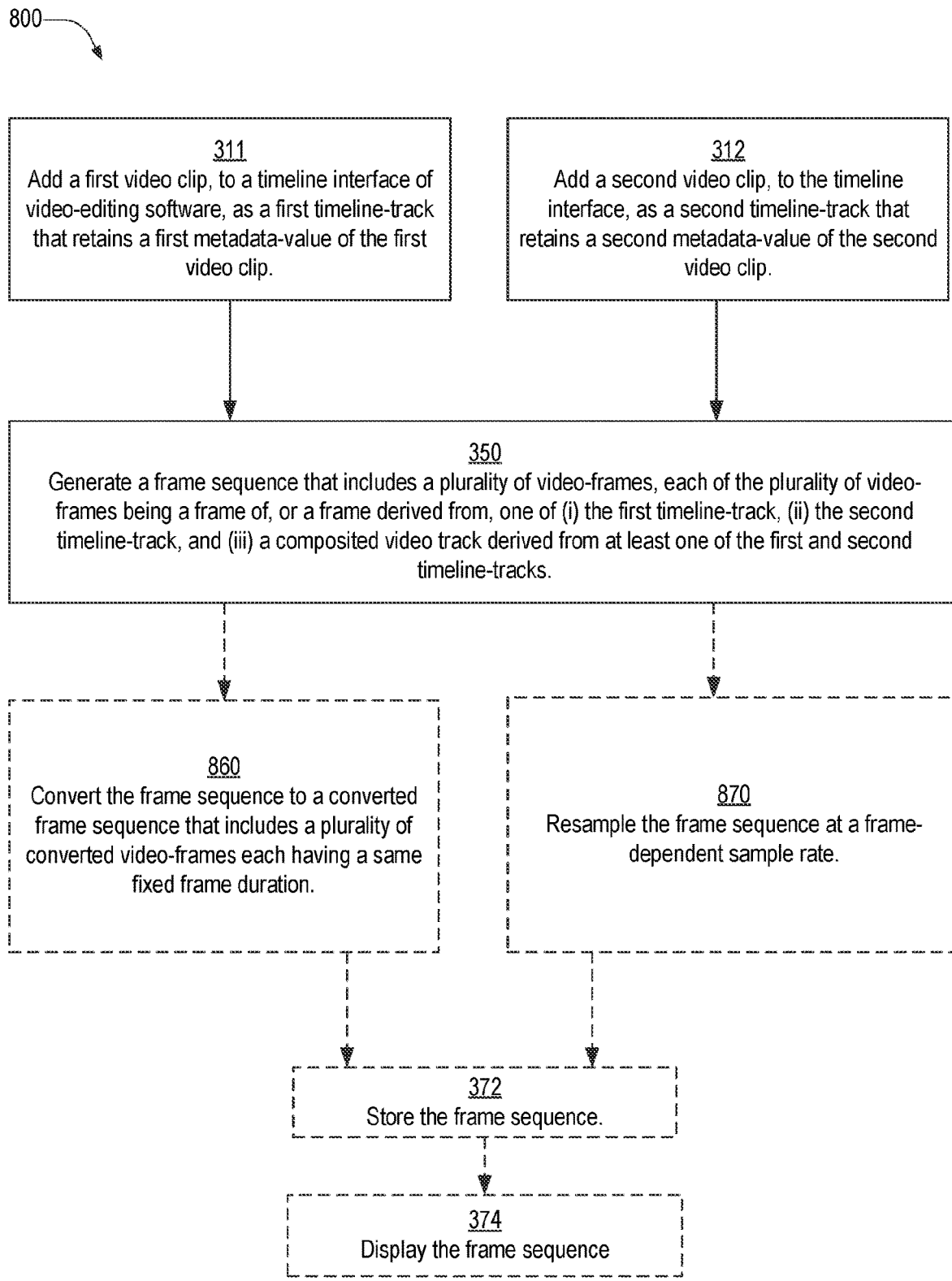
FIG. 8 is a flowchart illustrating an embodiment of the method of FIG. 3 that is implementable by the content creation tool of either FIG. 2, 4, or 6.

FIG. 8 is a flowchart illustrating a video-content creation method 800. Method 800 is an example of method 300, and is applicable when the first metadata-item is video resolution and reference monitor 125 does not support variable-frame rate frame sequences. In embodiments, method 800 is implemented within one or more aspects of content creation tool 200, 400, or 600. In embodiments, method 800 is implemented by processor 202 executing computer-readable instructions of software 210, 410, or 610. Method 800 includes previously described steps 311, 312, and 350. Method 800 also includes a step 860. In embodiments, method 800 also includes at least one of steps 372 and 374.

Step 860 includes converting the frame sequence to a converted frame sequence that includes a plurality of converted video frames each having a same fixed frame duration. In an example of step 860, content creation tool 200 converts frame sequence 240 to a converted-frame sequence 280 stored in memory 204. Each frame of converted-frame sequence 280 has the same fixed frame-duration 282.

In embodiments, metadata-item 291 is frame duration and each metadata-value 291V(k) of video frame 242($k$) equals an integer multiple $M_k$ of fixed frame-duration 282, where k is a positive integer less than equal to $N_3$. Converted-frame sequence 280 has a plurality of converted frames including, for each value of k ranging from 1 to $N_3$, $M_k$ instances of each video frame 242(k).

In embodiments, the plurality of video frames including frames $F_1, F_2, \ldots, F_N$ having respective frame durations $D_1, D_2, \ldots, D_N$ assigned to the first metadata-item. In such embodiments, method 800 may include a step 870, which includes resampling the frame sequence at a frame-dependent resample rate $R_1, R_2, \ldots, R_N$ determined by frame durations $D_1, D_2, \ldots, D_N$ and the fixed frame duration. For example, frame-dependent resample rate $R_k$ may be proportional to a ratio of frame duration $D_k$ and the fixed frame duration. In an example of step 870, frame sequence 240 has a variable frame duration (and hence a variable frame rate), and content creation tool 200 converts frame sequence 240 to a converted-frame sequence 280 stored in memory 204. Each frame of converted-frame sequence 280 has a variable frame-duration that depends on frame durations of frame sequence 240.

Figure 9:
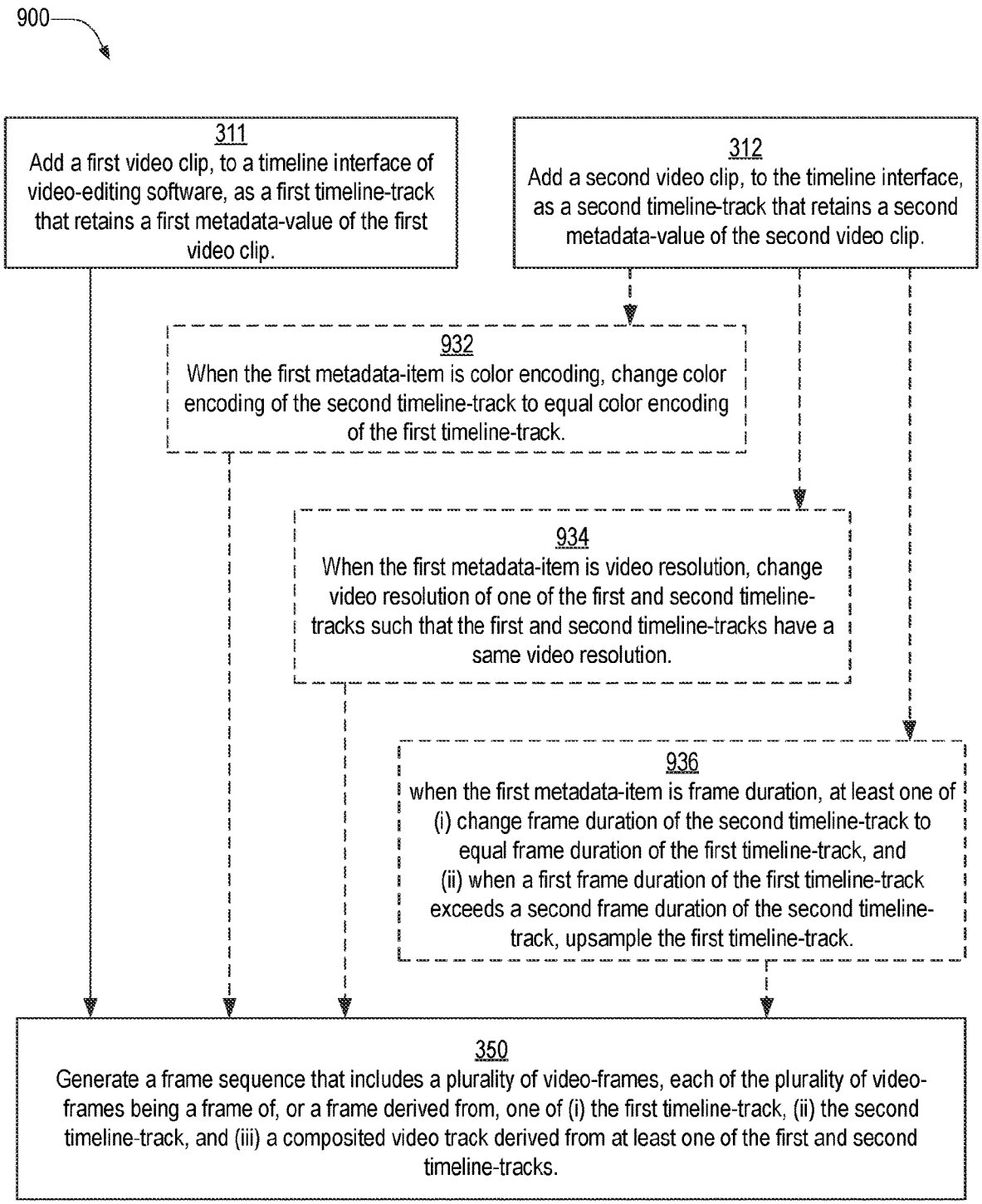
FIG. 9 is a flowchart illustrating an embodiment of the method of FIG. 3 that is implementable by the content creation tool of either FIG. 2, 4, or 6.

FIG. 9 is a flowchart illustrating a video-content creation method 900. Method 900 is an example of method 300 and is applicable when the second video clip is generated by a graphics processor. In embodiments, method 900 is implemented by processor 202 executing computer-readable instructions of software 210, 410, or 610. Method 900 includes steps 311, 312, and 350 of method 300. Method 900 also includes at least one of steps 932, 934, and 936 after step 312 and before step 350. Steps 932, 934, and 936 apply when the first metadata-item is color encoding, video resolution, and frame duration respectively.

Step 932 includes changing color encoding of the second timeline-track to equal color encoding of the first timeline-track. In an example of step 932, content creation tool 200 changes the color encoding of timeline-track 232(2) to the color encoding of timeline-track 232(1).

Step 934 includes changing the video resolution of one of the first and second timeline-tracks such that the first and second timeline-tracks have a same video resolution. In a first example of step 934, content creation tool 200 changes the video resolution of timeline-track 232(2) to equal the video resolution of timeline-track 232(1). In a second example of step 934, content creation tool 200 changes the video resolution of timeline-track 232(1) to equal the video resolution of timeline-track 232(2).

Step 936 includes at least one of (i) changing frame duration of the second timeline-track to equal frame duration of the first timeline-track, and (ii) when a first frame duration of the first timeline-track exceeds a second frame duration of the second timeline-track, upsample the first timeline-track. In an example of step 936, content creation tool 200 at least one of (i) changing frame duration of timeline-track 232(2) to equal the frame duration of timeline-track 232(2), and (ii) when a first frame duration of timeline-track 232(1) exceeds a second frame duration of timeline-track 232(2), upsample timeline-track 232(1).

Features described above, as well as those claimed below, may be combined in various ways without departing from the scope hereof. The following enumerated examples illustrate some possible, non-limiting combinations.

(A1) A content-creation tool includes a processor and a memory. The processor is configured to receive a first video clip and a second video clip. A first metadata-item of the first video clip is set to a first metadata-value; the first metadata-item of the second video clip is set to a second metadata-value. The memory stores video-editing software that includes a timeline interface and non-transitory computer-readable instructions that, when executed by the processor, control the processor to: add the first video clip to the timeline interface as a first timeline-track that retains the first metadata-value of the first video clip; add the second video clip to the timeline interface as a second timeline-track that retains the second metadata-value of the second video clip; and generate a frame sequence that includes a plurality of video frames. Each of the plurality of video frames is a frame of, or a frame derived from, one of (i) the first timeline-track, (ii) the second timeline-track, and (iii) a composited timeline-track composited from at least one of the first and second timeline-tracks.

(A2) In embodiments of content-creation tool (A1), metadata of each of the plurality of video frames includes the first metadata-item, the plurality of video frames includes at (i) a first video frame, the first metadata-item thereof being set to the first metadata-value, and (ii) a second video frame, the first metadata-item thereof being set to the second metadata-value.

(A3) In embodiments of either of content-creation tools (A1) and (A2), at least one of the first video clip and the second video clip is a single video frame.

(A4) In embodiments of any of content-creation tools (A1)-(A3), the second metadata-value differs from the first metadata-value.

(A5) In embodiments of any of content-creation tools (A1)-(A4), the second timeline-track temporally follows the first timeline-track in the frame sequence.

(A6) In embodiments of any of content-creation tools (A1)-(A5), the first metadata-item includes one of frame rate, video resolution, color space, RGB primaries, RGB signal color range, YUV Matrix, YUV offset, electro-optic transfer function, gamma, tone-curve parameters, dynamic range, minimum luminance, maximum luminance, color gamut size, opponent matrix, bit depth, and chroma sub-sampling.

(A7) In embodiments of any of content-creation tools (A1)-(A6), the first metadata-item is frame duration, and the memory further stores instructions that, when executed by the processor, control the processor to: enable a digital video interface, communicatively coupled to the content-creation tool, to support carriage of variable-refresh rate metadata.

(A8) In embodiments of any of content-creation tools (A1)-(A7), the first and second video clips being two of a plurality of video clips, and one of the plurality of video frames being a frame of, or a frame derived from, the composited timeline-track. The processor is configured to receive the plurality of video clips and a first metadata-item common to each of the plurality of video clips. The first metadata-item of each of the plurality of video clips is set to a respective one of a plurality of first single-clip metadata-values. The memory further stores instructions that, when executed by the processor, control the processor to: (a) for each of the plurality of video clips other than the first and the second video clip, add the video clip to the timeline interface as a respective timeline-track, of a plurality of timeline-tracks including the first and second timeline-tracks, that retains the first metadata-value of the video clip; (b) determine a first combined-clip metadata-value equal to a weighted combination of the plurality of first single-clip metadata-values; (c) for each timeline-track of the plurality of timeline-tracks having a first single-clip metadata-value not equal to the first combined-clip metadata-value, convert the timeline-track to a respective first converted timeline-track having a first single-clip metadata-value equal to the first combined-clip metadata-value; and (d) generate the composited timeline-track by digitally compositing (i) each first converted timeline-track and (ii) each unconverted timeline-track, of the plurality of timeline-tracks, having a first single-clip metadata-value equal to the first combined-clip metadata-value.

(A9) In embodiments of content-creation tool (A8), the memory further stores instructions that, when executed by the processor, control the processor to, before said generating the composited timeline-track: (a) determine, for a second metadata-item common to each of the plurality of video clips each having a respective one of a plurality of second single-clip metadata-values assigned to the second metadata-item, a second combined-clip metadata-value equal to a weighted combination of the plurality of second single-clip metadata-values; (b) for each timeline-track of the first converted timeline-tracks and the unconverted timeline-tracks having a second single-clip metadata-value not equal to the second combined-clip metadata-value, convert the timeline-track to a respective second converted timeline-track having a second single-clip metadata-value equal to the second combined-clip metadata-value; and (c) when generating the composited timeline-track, digitally composite (i) each second converted timeline-track and (ii) each timeline-track of the first converted timeline-tracks and the unconverted timeline-tracks, having a (1) first single-clip metadata-value equal to the first combined-clip metadata-value and (2) a second single-clip metadata-value equal to the second combined-clip metadata-value.

(A10) In embodiments of either of content-creation tools (A8) and (A9), the memory further stores instructions that, when executed by the processor, control the processor to alpha-blend each first converted timeline-track and each unconverted timeline-track when generating the composited timeline-track.

(A11) In embodiments of any of content-creation tools (A8)-(A10), the memory further stores instructions that, when executed by the processor, control the processor to update metadata of the composited timeline-track such that the first metadata-item is set to the first combined-clip metadata-value.

(A12) In embodiments of any of content-creation tools (A8)-(A11), one of the plurality of video frames is a frame of, or a frame derived from, the composited timeline-track and the memory further stores instructions that, when executed by the processor, control the processor to: (a) determine an interpolated metadata-value as a weighted sum of the first metadata-value and the second metadata-value; (b) convert the first timeline-track to a first converted track, the first metadata-item thereof being set to the interpolated metadata-value; (c) convert the second timeline-track to a second converted track, the first metadata-item thereof being set to the interpolated metadata-value; and (d) generate the composited timeline-track by digitally compositing the first and second converted tracks.

(A13) In embodiments of content-creation tool (A12), the memory further stores instructions that, when executed by the processor, control the processor to, when generating the composited timeline-track, alpha-blend the first and second converted tracks.

(A14) In embodiments of either of content-creation tools (A12) and (A13), the memory further stores instructions that, when executed by the processor, control the processor to update metadata of the composited timeline-track such that the first metadata-item thereof is set to the interpolated metadata-value.

(A15) In embodiments of any of content-creation tools (A1)-(A14), each video frame of the plurality of video frames includes a respective frame-metadata-value assigned to the first metadata-item, and the memory further stores instructions that, when executed by the processor, control the processor to, for each video frame, convert the video frame to a respective one of a plurality of converted video frames according to its frame-metadata-value.

(A16) In embodiments of content-creation tool (A15), the first metadata-item is color space, and the memory further stores instructions that, when executed by the processor, control the processor to, when converting each video frame: generate, from a plurality of pixel values of the video frame, a plurality of pixel values of the converted video frame representing components of a color space indicated by the frame-metadata-value.

(A17) In embodiments of content-creation tool (A16), the first metadata-item being video resolution, and the memory further stores instructions that, when executed by the processor, control the processor to, when converting each video frame: scale the video frame according to the frame metadata-value to yield the converted video frame.

(A18) In embodiments of content-creation tool (A15), the first metadata-item is frame duration, and the memory further stores instructions that, when executed by the processor, control the processor to: convert the frame sequence to a converted frame sequence that includes a plurality of converted video frames each having a same fixed frame duration.

(A19) In embodiments of content-creation tool (A18), the first metadata-item is frame duration, the plurality of video frames include frames $F_1, F_2, \ldots, F_N$ and having respective frame durations $D_1, D_2, \ldots, D_N$ assigned to the first metadata-item and equal to an integer multiple $M_1, M_2, \ldots, M_N$ of the fixed frame duration, and the plurality of converted frames include $M_k$ instances of each frame $F_k$, k being a positive integer less than equal to N.

(A20) In embodiments of any of content-creation tools (A1)-(A15), the first metadata-item is frame duration, the plurality of video frames including frames $F_1, F_2, \ldots, F_N$ having respective frame durations $D_1, D_2, \ldots, D_N$ assigned to the first metadata-item, the memory further storing instructions that, when executed by the processor, control the processor to, when converting the frame sequence, resample the frame sequence at a frame-dependent resample rate $R_1, R_2, \ldots, R_N$ determined by frame durations $D_1, D_2, \ldots, D_N$ and the fixed frame duration.

(A21) In embodiments of any of content-creation tools (A1)-(A20), wherein the second video clip was generated by a graphics processor, the memory further stores instructions that, when executed by the processor, control the processor to: (a) when the first metadata-item is color encoding, change color encoding of the second timeline-track to equal color encoding of the first timeline-track; (b) when the first metadata-item is video resolution, change video resolution of one of the first and second timeline-tracks such that the first and second timeline-tracks have a same video resolution; and (c) when the first metadata-item is frame duration, at least one of (i) change frame duration of the second timeline-track to equal frame duration of the first timeline-track, and (ii) when a first frame duration of the first timeline-track exceeds a second frame duration of the second timeline-track, upsample the first timeline-track.

(B1) A video-content creation method includes (a) adding a first video clip, to a timeline interface of video-editing software, as a first timeline-track that retains a first metadata-value of the first video clip; (b) adding a second video clip to the timeline interface as a second timeline-track that retains a second metadata-value of the second video clip; and (c) generating a frame sequence that includes a plurality of video frames, each of the plurality of video frames being a frame of, or a frame derived from, one of (i) the first timeline-track, (ii) the second timeline-track, and (iii) a composited timeline-track composited from at least one of the first and second timeline-tracks.

(B2) In embodiments, the video-content creation method (B1) also includes storing the frame sequence as a first media file saved to a non-volatile data storage device in a first file format that supports dynamic metadata.

(B3) In embodiments of either of video-content creation methods (B1) and (B2), also includes displaying the frame sequence on a video display.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. Herein, "a plurality of" denotes two or more, while "a number of" denotes one or more. The following claims are intended to cover all generic and specific features described herein, as well as all statements of the scope of the present method and system, which, as a matter of language, might be said to fall therebetween.

Various aspects of the present invention may be appreciated from the following enumerated example embodiments (EEEs):

EEE1. A content-creation tool comprising:
a processor configured to receive a first video clip and a second video clip, a first metadata-item of the first video clip being set to a first metadata-value, the first metadata-item of the second video clip being set to a second metadata-value; and a memory storing video-editing software that includes a timeline interface and non-transitory computer-readable instructions that, when executed by the processor, control the processor to:
add the first video clip to the timeline interface as a first timeline-track that retains the first metadata-value of the first video clip;
add the second video clip to the timeline interface as a second timeline-track that retains the second metadata-value of the second video clip; and generate a frame sequence that includes a plurality of video frames, each of the plurality of video frames being a frame of, or a frame derived from, one of (i) the first timeline-track, (ii) the second timeline-track, and (iii) a composited timeline-track composited from at least one of the first and second timeline-tracks.

EEE2. The content-creation tool of EEE 1, metadata of each of the plurality of video frames including the first metadata-item, the plurality of video frames including at (i) a first video frame, the first metadata-item thereof being set to the first metadata-value, and (ii) a second video frame, the first metadata-item thereof being set to the second metadata-value.

EEE3. The content-creation tool of EEE 1, the second metadata-value differing from the first metadata-value.

EEE4. The content-creation tool of EEE 1, the second timeline-track temporally following the first timeline-track in the frame sequence.

EEE5. The content-creation tool of EEE 1, the first metadata-item including one of frame rate, video resolution, color space, RGB primaries, RGB signal color range, YUV Matrix, YUV offset, electro-optic transfer function, gamma, tone-curve parameters, dynamic range, minimum luminance, maximum luminance, color gamut size, opponent matrix, bit depth, and chroma subsampling.

EEE6. The content-creation tool of EEE 1, the first metadata-item being frame duration, the memory further storing instructions that, when executed by the processor, control the processor to:
enable a digital video interface, communicatively coupled to the content-creation tool, to support carriage of variable-refresh rate metadata.

EEE7. The content-creation tool of EEE 1, the first and second video clips being two of a plurality of video clips, and one of the plurality of video frames being a frame of, or a frame derived from, the composited timeline-track,
the processor being configured to receive the plurality of video clips and a first metadata-item common to each of the plurality of video clips, the first metadata-item of each of the plurality of video clips being set to a respective one of a plurality of first single-clip metadata-values,
the memory further storing instructions that, when executed by the processor, control the processor to:
for each of the plurality of video clips other than the first and the second video clip, add the video clip to the timeline interface as a respective timeline-track, of a plurality of timeline-tracks including the first and second timeline-tracks, that retains the first metadata-value of the video clip;
determine a first combined-clip metadata-value equal to a weighted combination of the plurality of first single-clip metadata-values;
for each timeline-track of the plurality of timeline-tracks having a first single-clip metadata-value not equal to the first combined-clip metadata-value, convert the timeline-track to a respective first converted timeline-track having a first single-clip metadata-value equal to the first combined-clip metadata-value; and
generate the composited timeline-track by digitally compositing (i) each first converted timeline-track and (ii) each unconverted timeline-track, of the plurality of timeline-tracks, having a first single-clip metadata-value equal to the first combined-clip metadata-value.

EEE8. The content-creation tool of EEE 5, the memory further storing instructions that, when executed by the processor, control the processor to, before said generating the composited timeline-track:
determine, for a second metadata-item common to each of the plurality of video clips each having a respective one of a plurality of second single-clip metadata-values assigned to the second metadata-item, a second combined-clip metadata-value equal to a weighted combination of the plurality of second single-clip metadata-values;
for each timeline-track of the first converted timeline-tracks and the unconverted timeline-tracks having a second single-clip metadata-value not equal to the second combined-clip metadata-value, convert the timeline-track to a respective second converted timeline-track having a second single-clip metadata-value equal to the second combined-clip metadata-value; and
when generating the composited timeline-track, digitally composite (i) each second converted timeline-track and (ii) each timeline-track of the first converted timeline-tracks and the unconverted timeline-tracks, having a (a) first single-clip metadata-value equal to the first combined-clip metadata-value and (b) a second single-clip metadata-value equal to the second combined-clip metadata-value.

EEE9. The content-creation tool of EEE 5, the memory further storing instructions that, when executed by the processor, control the processor to update metadata of the composited timeline-track such that the first metadata-item is set to the first combined-clip metadata-value.

EEE10. The content-creation tool of EEE 1, one of the plurality of video frames being a frame of, or a frame derived from, the composited timeline-track and the memory further storing instructions that, when executed by the processor, control the processor to:
  determine an interpolated metadata-value as a weighted sum of the first metadata-value and the second metadata-value;
  convert the first timeline-track to a first converted track, the first metadata-item thereof being set to the interpolated metadata-value;
  convert the second timeline-track to a second converted track, the first metadata-item thereof being set to the interpolated metadata-value; and
  generate the composited timeline-track by digitally compositing the first and second converted tracks.

EEE11. The content-creation tool of EEE 8, the memory further storing instructions that, when executed by the processor, control the processor to update metadata of the composited timeline-track such that the first metadata-item thereof is set to the interpolated metadata-value.

EEE12. The content-creation tool of EEE 1, each video frame of the plurality of video frames including a respective frame-metadata-value assigned to the first metadata-item, the memory further storing instructions that, when executed by the processor, control the processor to, for each video frame,
  convert the video frame to a respective one of a plurality of converted video frames according to its frame-metadata-value.

EEE13. The content-creation tool of EEE 10, the first metadata-item being color space, the memory further storing instructions that, when executed by the processor, control the processor to, when converting each video frame:
  generate, from a plurality of pixel values of the video frame, a plurality of pixel values of the converted video frame representing components of a color space indicated by the frame-metadata-value.

EEE14. The content-creation tool of EEE 10, the first metadata-item being video resolution, the memory further storing instructions that, when executed by the processor, control the processor to, when converting each video frame:
  scale the video frame according to the frame metadata-value to yield the converted video frame.

EEE15. The content-creation tool of EEE 1, the first metadata-item being frame duration, the memory further storing instructions that, when executed by the processor, control the processor to:
  convert the frame sequence to a converted frame sequence that includes a plurality of converted video frames each having a same fixed frame duration.

EEE16. The content-creation tool of EEE 0, the plurality of video frames including frames $F_1, F_2, \ldots, F_N$ and having respective frame durations $D_1, D_2, \ldots, D_N$ assigned to the first metadata-item and equal to an integer multiple $M_1, M_2, \ldots, M_N$ of the fixed frame duration, the plurality of converted frames including $M_k$ instances of each frame $F_k$, k being a positive integer less than equal to N.

EEE17. The content-creation tool of EEE 1, the plurality of video frames including frames $F_1, F_2, \ldots, F_N$ having respective frame durations $D_1, D_2, \ldots, D_N$ assigned to the first metadata-item, the memory further storing instructions that, when executed by the processor, control the processor to, when converting the frame sequence, resample the frame sequence at a frame-dependent resample rate $R_1, R_2, \ldots, R_N$ determined by frame durations $D_1, D_2, \ldots, D_N$ and the fixed frame duration.

EEE18. The content-creation tool of EEE 1, the second video clip having been generated by a graphics processor, the memory further storing instructions that, when executed by the processor, control the processor to:
  when the first metadata-item is color encoding, change color encoding of the second timeline-track to equal color encoding of the first timeline-track;
  when the first metadata-item is video resolution, change video resolution of one of the first and second timeline-tracks such that the first and second timeline-tracks have a same video resolution; and
  when the first metadata-item is frame duration, at least one of (i) change frame duration of the second timeline-track to equal frame duration of the first timeline-track, and (ii) when a first frame duration of the first timeline-track exceeds a second frame duration of the second timeline-track, upsample the first timeline-track.

EEE19. A video-content creation method comprising:
  adding a first video clip, to a timeline interface of video-editing software, as a first timeline-track that retains a first metadata-value of the first video clip;
  adding a second video clip to the timeline interface as a second timeline-track that retains a second metadata-value of the second video clip; and
  generating a frame sequence that includes a plurality of video frames, each of the plurality of video frames being a frame of, or a frame derived from, one of (i) the first timeline-track, (ii) the second timeline-track, and (iii) a composited timeline-track composited from at least one of the first and second timeline-tracks.

EEE20. The method of EEE 15, further comprising storing the frame sequence as a first media file saved to a non-volatile data storage device in a first file format that supports dynamic metadata.

The invention claimed is:
1. A content-creation tool comprising:
a processor configured to receive a first video clip and a second video clip, a first metadata-item of the first video clip being set to a first metadata-value, the first metadata-item of the second video clip being set to a second metadata-value; and
a memory storing video-editing software that includes a timeline interface and non-transitory computer-readable instructions that, when executed by the processor, control the processor to:

add the first video clip to the timeline interface as a first timeline-track that retains the first metadata-value of the first video clip;

add the second video clip to the timeline interface as a second timeline-track that retains the second metadata-value of the second video clip, the first and second video clips being two of a plurality of video clips;

generate a frame sequence that includes a plurality of video frames, each of the plurality of video frames being a frame of, or a frame derived from, one of (i) the first timeline-track, (ii) the second timeline-track, and (iii) a composited timeline-track composited from at least one of the first and second timeline-tracks;

receive the plurality of video clips and a first metadata-item common to each of the plurality of video clips, the first metadata-item of each of the plurality of video clips being set to a respective one of a plurality of first single-clip metadata-values, for each of the plurality of video clips other than the first and the second video clip, add the video clip to the timeline interface as a respective timeline-track, of a plurality of timeline-tracks including the first and second timeline-tracks, that retains the first metadata-value of the video clip;

determine a first combined-clip metadata-value equal to a weighted combination of the plurality of first single-clip metadata-values;

for each timeline-track of the plurality of timeline-tracks having a first single-clip metadata-value not equal to the first combined-clip metadata-value, convert the timeline-track to a respective first converted timeline-track having a first single-clip metadata-value equal to the first combined-clip metadata-value; and generate the composited timeline-track by digitally compositing (i) each first converted timeline-track and (ii) each unconverted timeline-track, of the plurality of timeline-tracks, having a first single-clip metadata-value equal to the first combined-clip metadata-value.

2. The content-creation tool of claim 1, metadata of each of the plurality of video frames including the first metadata-item, the plurality of video frames including one of (i) a first video frame, the first metadata-item thereof being set to the first metadata-value, and (ii) a second video frame, the first metadata-item thereof being set to the second metadata-value.

3. The content-creation tool of claim 1, the second metadata-value differing from the first metadata-value.

4. The content-creation tool of claim 1, the first metadata-item including one of frame rate, video resolution, color space, RGB primaries, RGB signal color range, YUV Matrix, YUV offset, electro-optic transfer function, gamma, tone-curve parameters, dynamic range, minimum luminance, maximum luminance, color gamut size, opponent matrix, bit depth, and chroma subsampling.

5. The content-creation tool of claim 1, the memory further storing instructions that, when executed by the processor, control the processor to, before said generating the composited timeline-track:

determine, for a second metadata-item common to each of the plurality of video clips each having a respective one of a plurality of second single-clip metadata-values assigned to the second metadata-item, a second combined-clip metadata-value equal to a weighted combination of the plurality of second single-clip metadata-values;

for each timeline-track of the first converted timeline-tracks and the unconverted timeline-tracks having a second single-clip metadata-value not equal to the second combined-clip metadata-value, convert the timeline-track to a respective second converted timeline-track having a second single-clip metadata-value equal to the second combined-clip metadata-value; and when generating the composited timeline-track, digitally composite (i) each second converted timeline-track and (ii) each timeline-track of the first converted timeline-tracks and the unconverted timeline-tracks, having a (a) first single-clip metadata-value equal to the first combined-clip metadata-value and (b) a second single-clip metadata-value equal to the second combined-clip metadata-value.

6. The content-creation tool of claim 1, the memory further storing instructions that, when executed by the processor, control the processor to update metadata of the composited timeline-track such that the first metadata-item is set to the first combined-clip metadata-value.

7. The content-creation tool of claim 1, one of the plurality of video frames being a frame of, or a frame derived from, the composited timeline-track and the memory further storing instructions that, when executed by the processor, control the processor to:

determine an interpolated metadata-value as a weighted sum of the first metadata-value and the second metadata-value;

convert the first timeline-track to a first converted track, the first metadata-item thereof being set to the interpolated metadata-value;

convert the second timeline-track to a second converted track, the first metadata-item thereof being set to the interpolated metadata-value; and generate the composited timeline-track by digitally compositing the first and second converted tracks.

8. The content-creation tool of claim 7, the memory further storing instructions that, when executed by the processor, control the processor to update metadata of the composited timeline-track such that the first metadata-item thereof is set to the interpolated metadata-value.

9. The content-creation tool of claim 1, each video frame of the plurality of video frames including a respective frame-metadata-value assigned to the first metadata-item, the memory further storing instructions that, when executed by the processor, control the processor to, for each video frame, convert the video frame to a respective one of a plurality of converted video frames according to its frame-metadata-value.

10. The content-creation tool of claim 1, the first metadata-item being frame duration, the memory further storing instructions that, when executed by the processor, control the processor to:

convert the frame sequence to a converted frame sequence that includes a plurality of converted video frames each having a same fixed frame duration.

11. The content-creation tool of claim 10, the plurality of video frames including frames $F_1, F_2, \ldots, F_N$ and having respective frame durations $D_1, D_2, \ldots, D_N$ assigned to the first metadata-item and equal to an integer multiple $M_1, M_2, \ldots, M_N$ of the fixed frame duration, the plurality of converted frames including $M_k$ instances of each frame $F_K$, k being a positive integer less than equal to N.

12. The content-creation tool of claim 1, the plurality of video frames including frames $F_1, F_2, \ldots, F_N$ having respective frame durations $D_1, D_2, \ldots, D_N$ assigned to the first metadata-item, the memory further storing instructions that, when executed by the processor, control the processor to, when converting the frame sequence, resample the frame sequence at a frame-dependent resample rate $R_1, R_2, \ldots, R_N$ determined by frame durations $D_1, D_2, \ldots, D_N$ and the fixed frame duration.

13. The content-creation tool of claim 1, the second video clip having been generated by a graphics processor, the memory further storing instructions that, when executed by the processor, control the processor to:
when the first metadata-item is color encoding, change color encoding of the second timeline-track to equal color encoding of the first timeline-track;
when the first metadata-item is video resolution, change video resolution of one of the first and second timeline-tracks such that the first and second timeline-tracks have a same video resolution; and
when the first metadata-item is frame duration, at least one of (i) change frame duration of the second timeline-track to equal frame duration of the first timeline-track, and (ii) when a first frame duration of the first timeline-track exceeds a second frame duration of the second timeline-track, upsample the first timeline-track.

14. A video-content creation method comprising:
adding a first video clip, to a timeline interface of video-editing software, as a first timeline-track that retains a first metadata-value of the first video clip;
adding a second video clip to the timeline interface as a second timeline-track that retains a second metadata-value of the second video clip, the first and second video clips being two of a plurality of video clips;
generating a frame sequence that includes a plurality of video frames, each of the plurality of video frames being a frame of, or a frame derived from, one of (i) the first timeline-track, (ii) the second timeline-track, and (iii) a composited timeline-track composited from at least one of the first and second timeline-tracks;
setting the first metadata-item of each of the plurality of video clips to a respective one of a plurality of first single-clip metadata-values;
determining a first combined-clip metadata-value equal to a weighted combination of the plurality of first single-clip metadata-values;
for each timeline-track of the plurality of timeline-tracks having a first single-clip metadata-value not equal to the first combined-clip metadata-value, converting the timeline-track to a respective first converted timeline-track having a first single-clip metadata-value equal to the first combined-clip metadata-value; and
generating the composited timeline-track by digitally compositing (i) each first converted timeline-track and (ii) each unconverted timeline-track, of the plurality of timeline-tracks, having a first single-clip metadata-value equal to the first combined-clip metadata-value.

15. The video-content creation method of claim 14, further comprising:
determining an interpolated metadata-value as a weighted sum of the first metadata-value and the second metadata-value;
converting the first timeline-track to a first converted track, the first metadata-item thereof being set to the interpolated metadata-value;
converting the second timeline-track to a second converted track, the first metadata-item thereof being set to the interpolated metadata-value; and
generating the composited timeline-track by digitally compositing the first and second converted tracks.

16. The video-content creation method of claim 14, the first metadata-item being frame duration, the method further comprising:
converting the frame sequence to a converted frame sequence that includes a plurality of converted video frames each having a same fixed frame duration, the plurality of video frames including frames $F_1, F_2, \ldots, F_N$ and having respective frame durations $D_1, D_2, \ldots, D_N$ assigned to the first metadata-item and equal to an integer multiple $M_1, M_2, \ldots, M_N$ of the fixed frame duration, the plurality of converted frames including $M_K$ instances of each frame $F_K$, k being a positive integer less than equal to N.

* * * * *